United States Patent [19]
Whittenberger

[11] Patent Number: 5,140,813
[45] Date of Patent: Aug. 25, 1992

[54] COMPOSITE CATALYTIC CONVERTER

[76] Inventor: William A. Whittenberger, 12126 State Rd. 282, Garrettsville, Ohio 44231

[21] Appl. No.: 606,129

[22] Filed: Oct. 31, 1990

[51] Int. Cl.$^5$ .................................................. F01N 3/28
[52] U.S. Cl. ........................................ 60/300; 60/299; 422/174; 422/180
[58] Field of Search .................. 60/300, 299; 422/174, 422/180

[56] References Cited

U.S. PATENT DOCUMENTS

| | | |
|---|---|---|
| 3,768,982 | 10/1973 | Kitzner . |
| 3,770,389 | 10/1973 | Kitzner . |
| 3,795,524 | 3/1974 | Sowman ............................... 106/65 |
| 4,414,023 | 11/1983 | Aggen et al. ........................ 75/124 |
| 4,711,009 | 12/1987 | Cornelison . |
| 4,810,588 | 3/1989 | Bullock .............................. 428/603 |
| 4,928,485 | 5/1990 | Whittenberger .................... 422/180 |

FOREIGN PATENT DOCUMENTS

| | | |
|---|---|---|
| 2333092 | 1/1975 | Fed. Rep. of Germany ...... 422/174 |
| WO89/10470 | 11/1989 | Fed. Rep. of Germany . |
| WO89/10471 | 11/1989 | Fed. Rep. of Germany . |

OTHER PUBLICATIONS

Allied Metglas Products "Filler Metal Alloys".

*Primary Examiner*—Douglas Hart

[57] ABSTRACT

There is provided a composite catalytic converter for removing pollutant materials from an exhaust gas stream. The converter is composed of an electrically heatable catalytic converter and a conventional ceramic catalytic converter in juxtaposed or embedded axial relationship whereby axial movement in a downstream direction of the electrically heatable catalytic converter core is resisted.

19 Claims, 4 Drawing Sheets

COMPOSITE CATALYTIC CONVERTER

This invention relates, as indicated, to a composite catalytic converter for converting gaseous pollutants in an exhaust gas stream to harmless and/or environmentally acceptable gaseous ingredients. These catalytic converters include an electrically heatable catalytic converter (EHC) and a nonelectrically heatable ceramic catalytic converter in reinforcing relation and in a common housing.

BACKGROUND OF THE INVENTION AND PRIOR ART

The purpose of a catalytic converter is to convert pollutant materials in engine or turbine exhaust, e.g., carbon monoxide, unburned hydrocarbons, nitrogen oxides, etc., to carbon dioxide, nitrogen and water. Conventional catalytic converters utilize a ceramic honeycomb monolith having square straight through openings or cells, catalyst coated alumina beads, or a corrugated thin metal foil honeycomb monolith having a catalyst carried on or supported by the surface. The catalyst is normally a noble metal, e.g., platinum, palladium, rhodium or ruthenium, or a mixture of two or more of such noble metals. The catalyst catalyzes a chemical reaction, oxidation, reduction, or both, whereby the pollutant is converted to a harmless byproduct which then passes through the exhaust system to the atmosphere. However, this conversion is not efficient initially when the exhaust gases and converter are relatively cold. To be effective at a high conversion rate, the catalyst and the surface of the converter with which the exhaust gases come in contact must be at a minimum elevated temperature, e.g., 390 F. for carbon monoxide, 570 F. for volatile organic compounds (VOC), and 1000 F. for methane or natural gas. Otherwise, conversion to harmless by-products is poor and cold start pollution of the atmosphere is high. Once the exhaust system has come to its operating temperature, the catalytic converter is optimally effective. Hence, it is necessary to contact relatively cold exhaust gases with hot catalyst to effect satisfactory conversion at engine start-up. Both compression ignited (diesel) and spark ignited engines have this need.

To achieve heating of the catalyst, there is provided an electrically heatable catalytic converter formed of a corrugated thin metal foil monolith which is connected to a voltage source, e.g., a 12 volt or 24 volt automotive battery, and power applied, preferably before and during start-up, to elevate and maintain the temperature of the catalyst at at least about 650 F. Reference may be had to copending application Ser. No. 587,219 filed Sep. 24, 1990 the disclosure of which application is incorporated herein by reference, for details of an electrically heatable catalytic converter core and a power system for effective heating of the metal monolith.

A problem exists with spirally wound or S-wound corrugated thin metal foil catalytic converters which the present invention solves. The corrugated thin metal monolith core is subject to telescoping in a severe test which the devices must pass. Such telescoping can result in destruction of the electrically heatable catalytic converter. This test involves oscillating (100-200 Hertz and 28 to 60 G) the device in a vertical attitude at high temperature (between 700 and 950 C.) with exhaust gas from a running internal combustion engine being passed through the device. If the wound core device telescopes in the direction of gas flow or breaks up after a predetermined time e.g., 5-200 hours, the device is said to fail the test. Usually, the device will fail in 5 hours if it is going to fail.

It is a principal object of the present invention to provide a device which will pass the foregoing test, and thereby be reliable in extreme service conditions..

Reference may be had to U.S. Pat. No. 3,768,982 to Kitzner dated Oct. 30, 1973. In this patent, heat from a centrally located electric heater is transferred by conduction through a monolithic catalyst support to heat the catalyst to optimum operating temperature. Reference may also be had to U.S. Pat. No. 3,770,389 to Kitzner dated Oct. 30, 1973 which discloses a central electrically heated core within a ceramic monolith, heat being transmitted by conduction to the catalyst contained in the openings of the ceramic monolith. The heating core is formed of metal sheets, one corrugated and the other flat, coated with alumina and also bearing a catalyst. The metallic core is heated electrically by virtue of its own electrical resistance. Heating by conduction takes too long to solve the problem of of atmospheric pollution at start-up. Moreover, the thin metal cores of the present invention do not require a flat thin metal sheet in alternating relation with a corrugated thin metal sheet. A flat thin metal sheet adds about 20% to 30% more weight to the device and necessitates a longer heat-up time or higher power input.

Reference may also be had to U.S. Pat. No. 4,711,009 to Cornelison et al dated Dec. 8, 1987 for details of a process for the preparation of corrugated thin metal foil with a refractory metal oxide coating thereon and having a noble metal catalyst deposited on the oxide surface. This foil may be accordion folded or spirally wound to form the electrically heatable monoliths hereof. This patent is incorporated herein by reference thereto.

Reference may also be had to International PCT publication number WO 89/10471 filed Nov. 2, 1989 which discloses an electrically conductive honeycomb catalyst support unit useful in automobiles. To obtain a suitable electrical resistance between 0.03 and 2 ohms, the honeycomb body is subdivided electrically, crosssectionally and or axially, by gaps and/or electrically insulating intermediate layers or coatings so that at least one electrical current path having the desired resistance is obtained. Heating is controlled by a timed relay. Separate catalytic converters in the exhaust line, one or more electrically heatable, the other conventional, are disclosed. The basic devices shown in this application and its companion WO 89/10470 filed Nov. 2, 1989 may be used in the present invention. Spiral wound or S-wound cores are subject to the same problem of telescoping under the severe test above described.

In the following description, reference will be made to "ferritic" stainless steel. A suitable formulation for this material is described in U.S. Pat. No. 4,414,023 dated Nov. 8, 1983 to Aggens et al. A specific ferritic stainless steel useful herein contains 20% chromium, 5% aluminum, and from 0.002% to 0.05% of at least one rare earth metal selected from cerium, lanthanum, neodymium, yttrium, and praseodymium, balance iron and steel making impurities.

In the following description, reference will also be made to fibrous ceramic mat or felt. Reference may be had to U.S. Pat. No. 3,795,524 dated Mar. 5, 1974 to Bowman for formulations and manufacture of ceramic fibers useful herein. One such material is currently commercially available under the registered trademark "INTERAM" from 3-M.

Reference will also be had to certain pending applications, i.e., Ser. No. 524,284 filed Apr. 16, 1990, and Ser. No. 587,219. These applications are commonly owned with the present application, and the disclosures thereof are incorporated herein by reference thereto.

BRIEF STATEMENT OF THE INVENTION

Briefly stated, the present invention is a composite polycellular catalytic converter comprising a housing, a polycellular electrically heatable catalytic monolith consisting of corrugated thin stainless steel having a refractory metal oxide coating on at least one surface thereof with a noble metal catalyst supported thereon in said housing, and a polycellular conventional ceramic catalytic monolith in juxtaposed or physically abutting coaxial relation with the electrically heatable catalytic monolith in said housing, and means for heating the electrically heatable catalytic monolith from a voltage source. In a preferred embodiment, the electrically heatable catalytic monolith is resting against or embedded in the upstream face of the conventional ceramic catalytic monolith. Alternatively, the electrically heatable catalytic monolith may be disposed between conventional monolith portions at least one of which contains a noble metal catalyst disposed in the cells thereof.

The conventional ceramic catalytic monolith provides several advantages. First, retrofitting with current catalytic converters is relatively easy. Second, ceramic provides good heat storage and permits the main catalyst unit to light-off pollutants more quickly with less energy loss than, for example, with a nonelectrically heatable corrugated thin metal monolith. Finally, the ceramic monolith seems to protect the catalyst more satisfactorily than a metallic, nonelectrically heatable catalytic monolith.

BRIEF DESCRIPTION OF THE DRAWINGS

The invention may be better understood by having reference to the annexed drawings illustrative of preferred embodiments of this invention and wherein.

DETAILED DESCRIPTION OF THE DRAWINGS

As indicated above, the present invention is a composite catalytic converter especially for use with internal combustion engines, compression or spark ignited, and mobile or stationary. The composite catalytic converter utilizes a single housing for an EHC and at least one conventional catalytic converter. The conventional catalytic converter is a ceramic monolith, e.g., Cordierite, or a Barium/Titanate ceramic. Most current automobiles, for example, have ceramic monoliths in the catalytic converters. The present invention provides among other things, a means for retrofitting current ceramic catalytic converter units with an electrically heatable catalytic converter (EHC) whereby the efficiency of the unit is improved to remove pollutants normally issuing from the exhaust pipe during start-up or cold operation when the catalyst is at a temperature below that required for optimum conversion of such pollutants.

Figure 1:
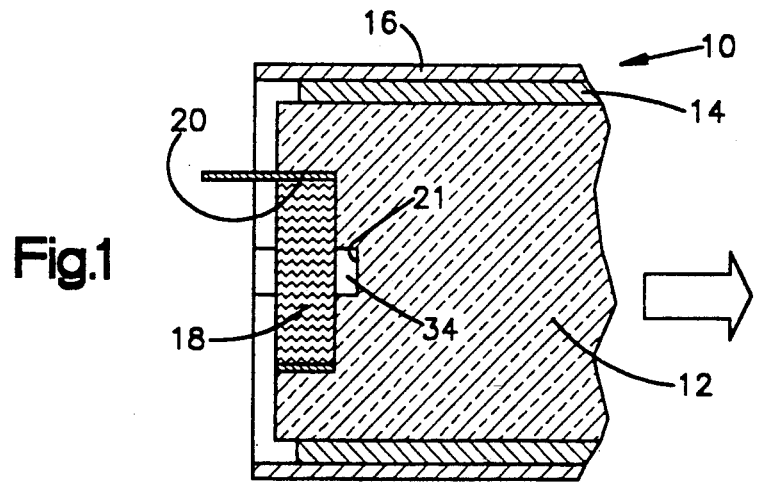
FIG. 1 is a cross-sectional view of a composite catalytic converter in accordance with this invention showing an electrically heatable corrugated thin metal catalytic converter embedded in the upstream face of a conventional ceramic catalytic converter which is not electrically heatable.

Referring now, more particularly to FIG. 1, there is here shown in cross-section a fragment of a composite catalytic converter unit 10 in accordance with this invention. The composite 10 is composed of a conventional polycellular ceramic monoliths 12 of the type in current use on automobiles. These monoliths are well known and may be circular or oval in cross section. Such monoliths are porous. They are formed by extrusion of a refractory composition and thus have straight-through cells usually numbering from about 100 to 400 cells per square inch. The cells may be circular, square or triangular in cross section and have a noble metal catalyst, e.g., platinum, or palladium, or rhodium, or ruthenium or a mixture of two or more of such metals, deposited in the pores of the ceramic monolith.

The ceramic core 12 is desirably supported by a wrapping of fibrous ceramic insulation 14 in a steel housing 16. Reference may be had to U.S. Pat. No. 3,795,524 dated Mar. 5, 1974 to Bowman for examples of fibrous ceramic insulation formulations. The steel housing 16 is a conventional housing for such ceramic monoliths and like that shown in FIG. 7. However, in FIG. 1, the forward or upstream end of the housing 16 has been carefully cut off adjacent the upstream face of the conventional monolith to permit an insertion including an electrically heatable catalytic converter unit 18 such as shown in FIG. 3. To accommodate the electrically heatable unit 18, the forward end of the ceramic core 12 is bored out to provide a recess 20 having a depth equal to the width of the thin metal foil forming the EHC 18. There is also provided within the recess 20 an inner recess 21 to accommodate the projecting ends of the electrically conducting rods or pins about which the individual corrugated metal strips are overfolded. If a solid rod or tube having a length equal to the axial dimension of the EHC and to which the overfolded ends of the strips are tack welded is used, the recess 21 is not necessary. The EHC is formed in a manner similar to that described in the aforesaid application Ser. No. 587,219, with particular reference to FIGS. 2, 2a and 5 of said application. No intra core insulation or separate flat thin metal strips are used in the EHC cores of the present invention. As described in U.S. Pat. No. 4,711,009 supra, the thin metal foil strips are first corrugated, preferably in a herringbone or chevron pattern and coated on at least one side with a washcoat of refractory metal oxide, e.g., gamma alumina desirably including a portion of ceria from 1% to 5% up to as much as 30%, and fired to set the coating. Thereafter, an aqueous solution of a noble metal catalyst is applied to the refractory metal oxide surface or surfaces and the catalyzed coated foil strip heated to a temperature sufficient to reduce the water soluble catalyst salt to the catalytically active metal. Alternatively, the corrugations may be straight through although nonnesting such as described in U.S. Pat. No. 4,810,588 dated Mar. 7, 1989 to Bullock et al. These fabrication steps are as described in the aforesaid U.S. Pat. No. 4,711,009. The coated catalyst bearing strips are then folded once over a wire bar and welded thereto as detailed in the aforesaid Ser. No. 587,219, and a plurality of such core elements gathered at the projecting wire ends, and then tightly wound in a spiral. The pins form a central core through which electric power is supplied to the catalytic core. As indicated in Ser. No. 587,219, the free ends of the overfolded corrugated strips are provided with electrical contact means ultimately to be connected to one of the poles of a direct current voltage source. The overfolded strips of corrugated metal without any bars, may, as above stated, be directly spot welded to a rod or tube core and the tube or rod core connected to one side of a voltage source.

Figure 2:
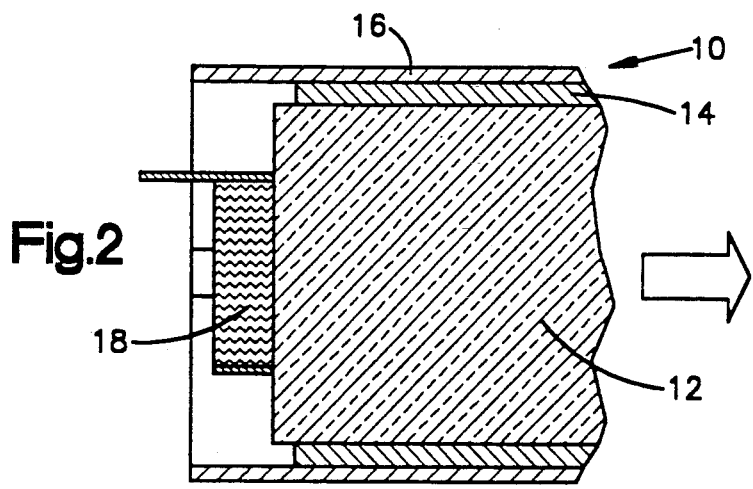
FIG. 2 is a cross-sectional view of a composite catalytic converter in accordance with this invention showing an electrically heatable catalytic converter in juxtaposition at the upstream face of a conventional ceramic catalytic converter which is not electrically heatable.
Figure 3:
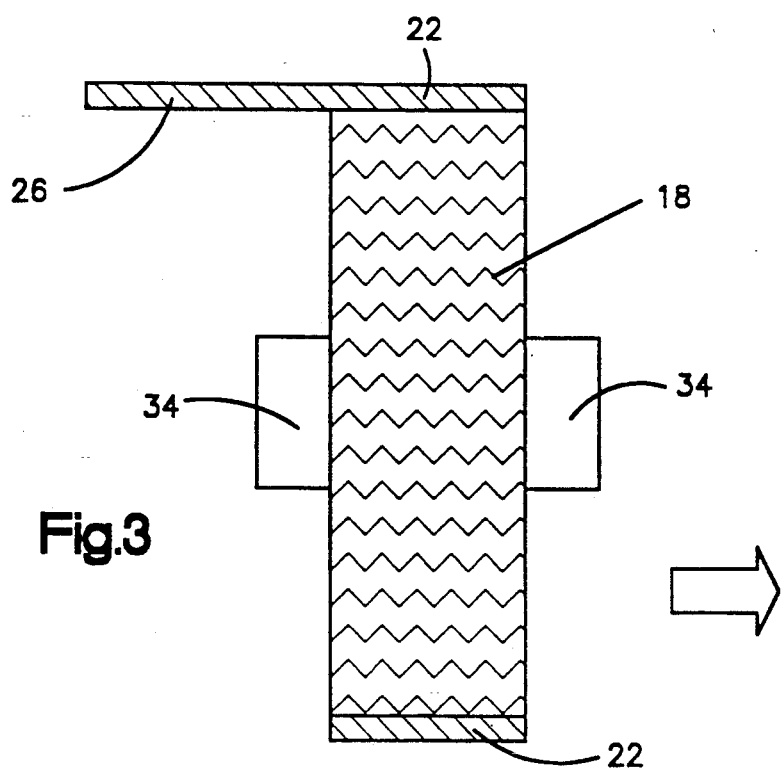
FIG. 3 is a side elevation of an EHC prior to insertion into a bore in the face of a conventional ceramic catalytic converter.

FIG. 2 shows an EHC having no projecting pins and in juxtaposition with the upstream face of the conventional ceramic catalytic core. Usually, the EHC has a smaller cross-sectional area than the conventional ceramic core, and it is therefore, desirable to recess the EHC at least partially into the upstream face of the ceramic core because it keeps the pressure drop across the face of the gas intercepting surface about the same. When the cross-sectional area of the EHC is equal to or about the same as the cross-sectional area of the ceramic core, the EHC may be located against the upstream face of the ceramic core in the manner shown in FIG. 2.

Figure 4:
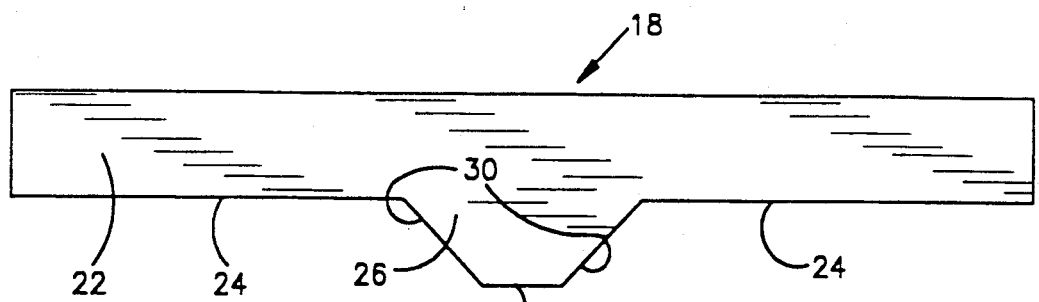
FIG. 4 is a developed blank of a current carrying band for an EHC.
Figure 5:
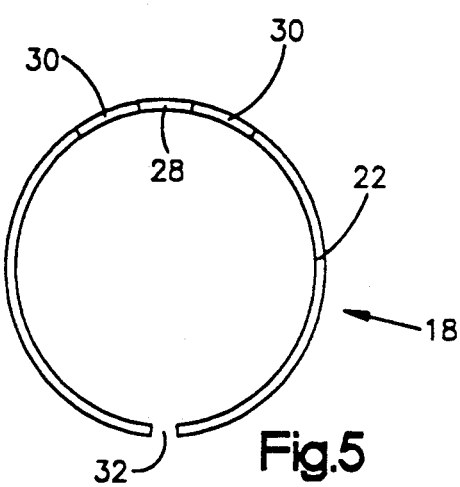
FIG. 5 is a front view of the band of FIG. 3 when rolled for surrounding a spirally wound corrugated thin metal catalytic core shown in FIG. 1.

The spirally wound core is then retained in a steel band. FIG. 4 shows a blank 22 about 0.75" wide which is conveniently formed of stainless steel, e.g., ferritic stainless steel. Centrally located on one edge 24 of the blank 22 is a projection 26 integral with the band. The width of the forward edge 28 of the projection 26 is desirably 0.75" and the projection 26 extends outwardly about 0.75". The projection is for the later installation of the electrical power post as described below. The sides 30 are at about a 135 degree angle to the edge line 24. As shown in FIG. 5, the blank 18 of FIG. 4 is wrapped in a circle having a diameter equal to the tightly compressed spiral core. The circle is not initially closed, leaving a gap 32 of about 0.12" to allow for compression of the spirally wound core after insertion into the band 22. The band 22 is welded to the free ends of the spiral core as described in Ser. No. 587,219 to provide good electrical communication between the band 22 and the core 18.

FIG. 3 shows the EHC assembly in side elevation prior to insertion in the ceramic core 12. Central post 34 bilaterally projecting from the spirally wound core 18 is the point to which the opposite pole of the direct current voltage source is attached.

Figures 6, 7:
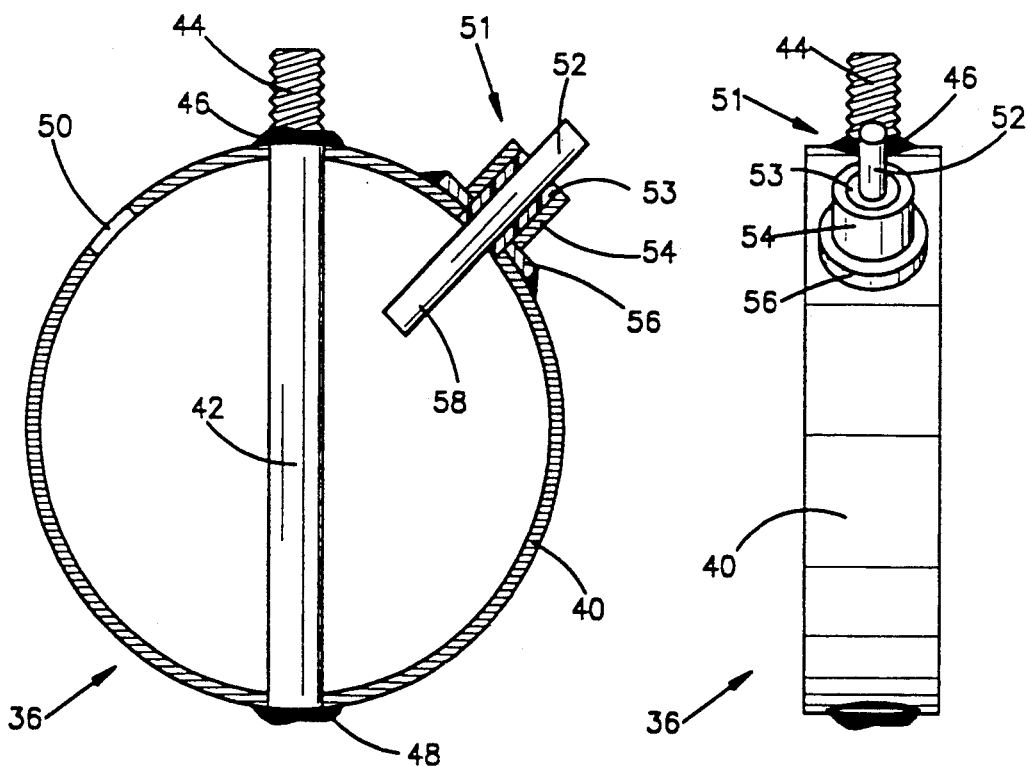
FIG. 6 is a front view of an extension piece for insertion in the housing of a conventional catalytic converter to retrofit such converter to include an electrically heatable core and showing the electrical connection bars for supplying power to the EHC.
FIG. 7 is an end view of the extension piece shown in FIG. 6.

FIGS. 6 and 7 show an extension piece 36 configured to fit between the transition end cap 38, or adapter 38, which enables connection of the catalytic converter to the exhaust pipe of the engine and the main body of the catalytic converter housing 16. The extension piece 36 has an oval or circular configuration depending on the cross-sectional configuration of the catalytic converter housing or cannister 16. The extension piece 36 includes an oval or circular band 40 and a ground bar 42. The ground bar 42 is desirably formed of nickel or an alloy of nickel. It extends along the minor diameter of an oval extension piece or a diameter of a circular piece.

The ground bar 42 extends through the extension piece 36 and is welded at the bottom 48 as shown in FIG. 6 and at the top 46. The projection 44 from the top is elongated and threated to accept a cable terminal and retaining nut, not shown.

There is provided a hole 50 through the wall of the extension piece 16 to enable the insertion of a thermocouple into the corrugated thin metal core 18. Details for the structure of the thermocouple lead in are shown in Ser. No. 587,219. The junction of the thermocouple is placed in a cell in the corrugated thin metal monolith and the leads insulated along their length and as they pass through the extension piece 36.

The positive terminal 52 also extends through the extension piece 36 with suitable insulation means generally indicated at 51. There is provided a metal bushing 54 welded to a collar 56 which is in turn, welded to the extension piece 36. The terminal 52 is encased in an insulating sleeve 54 to isolate the terminal from electrical contact with the inner end 58 of the terminal rod 52. The inner end 58 is then welded to the projection 26 of the clamping band 22 which, as described above, is welded to the free ends of the corrugated thin metal overfolded strips forming the polycellular core 18. Thus, the positive pole of a direct current voltage source is electrically connected to the voltage source.

The ground, or negative pole of the direct current voltage source, is connected to the projecting end 44 of the ground bar 42. The ground bar 42 is, upon assembly of the extension piece 36 to the downstream end of the converter housing 16, then welded to the central bar 34 formed of the of the plurality of projecting rods about which the corrugated thin metal strips are overfolded and which have been welded together. These operations are fully described in Ser. No. 587,219, supra. The positive and negative poles may be reversed, if desired.

After insertion of the EHC 18 into the recess 20 of the ceramic converter body 12 along with the extension piece 36, the transition piece 38 (FIG. 8) is welded to the outer free edge of the extension piece 36 to complete the retrofitted composite catalytic converter, and the entire assembly reconnected to the exhaust line 60.

As indicated above, the EHC is polycellular as is the conventional catalytic unit. The EHC monolith has a cell density of from 100 to 700 cells per square inch, preferably 150 to 300 cells per square inch, and the conventional catalytic converter unit, which is usually ceramic, has a cell density of from 100 to 400 cells per square inch. If the EHC must be separated from the ceramic converter unit for any reason, a ceramic block having an axial length of about 2 inches and having a cell density of from 16 to 36 cells per square inch, desirably with a catalyst deposited in the cells, may be inserted between the upstream face of the conventional catalytic converter unit and the downstream face of the EHC.

Thus, when from 1500 to 5000 watts of power from a voltage source, such as a 12 volt automobile battery, is connected across the terminals 44 and 52, power is supplied to the corrugated thin metal core 18, and because of the resistance of the thin metal strip portions, is able to effect heating of the electrically heatable catalytic converter very rapidly up to conversion temperature of at least about 650° F. in from 2-30 seconds.

The embodiment shown in FIGS. 1-9 will withstand the severe test conditions for at least 5 hours without experiencing telescoping of the EHC core.

Figure 8:
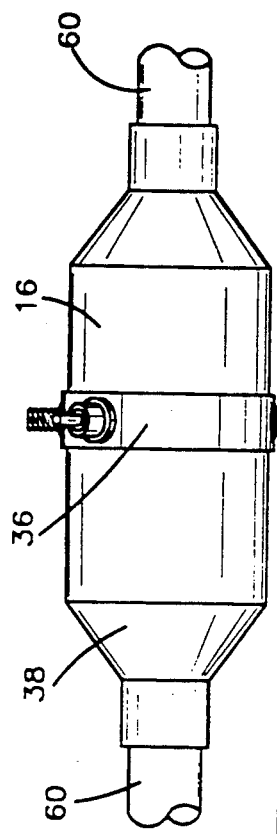
FIG. 8 is a side view of a retrofitted housing containing a composite catalytic converter in accordance herewith.
Figure 9:
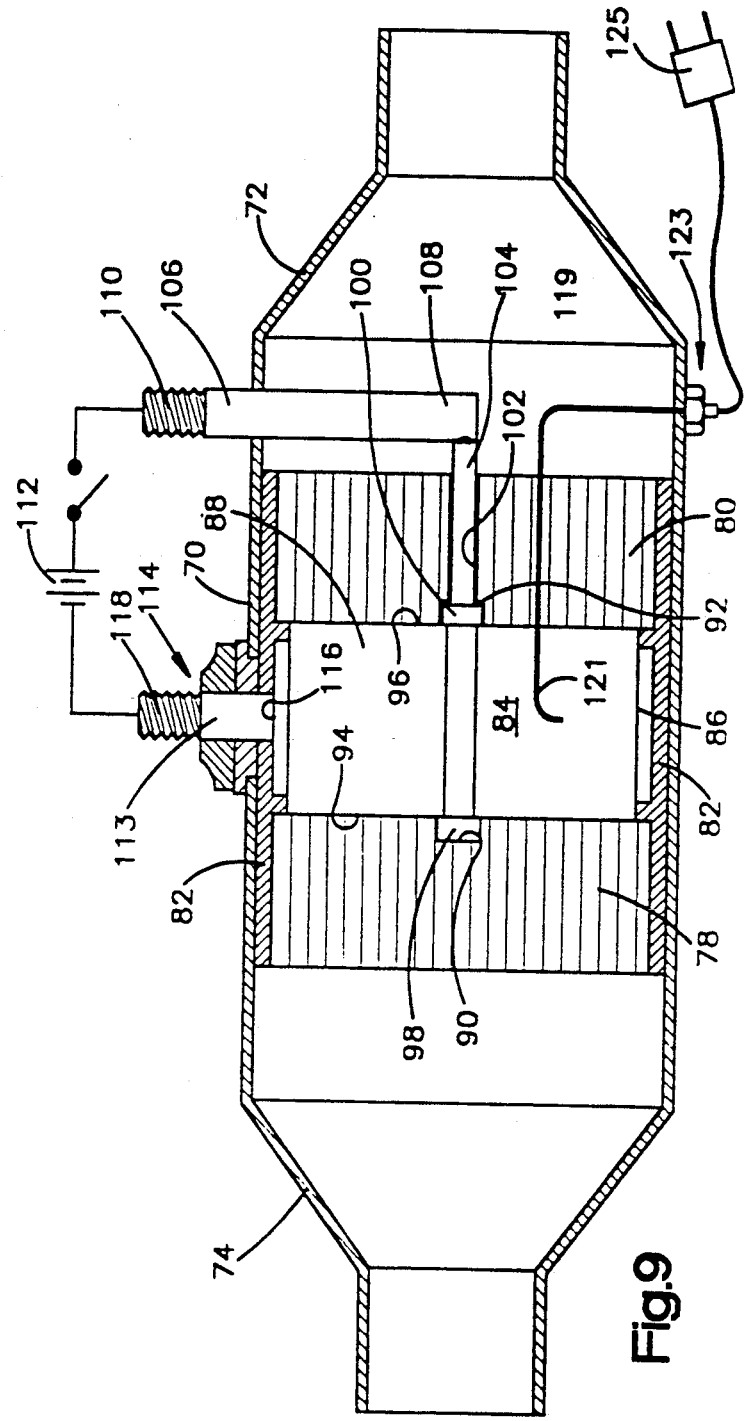
FIG. 9 is a cross-sectional view of another composite catalytic converter in accordance with this invention showing an electrically heatable corrugated thin metal catalytic converter in coaxial relation with, disposed between and in physical contact with polycellular ceramic portions at least one of which includes a catalyst on the inner surfaces of the cells thereof.

FIG. 9 shows another embodiment of the present invention wherein the EHC is coaxially disposed between and in contact with portions of a ceramic monolith. There is shown a housing 70 having transition end caps 72 and 74 welded thereto for accommodating a standard exhaust pipe 60 as in FIG. 8 and the oval or circular shape of the housing 70. Centrally located within the housing is a pair of axially spaced ceramic catalytic monoliths 78 and 80. These are inserted in the housing using a ceramic mat cushion 82. In the case of ceramic monoliths 78 and 80, the mat 82 serves to reduce the opportunity for damage to the monolith units 78 and 80 due to vibration.

The ceramic mat 82 also serves to restrain axial movement of the ceramic monoliths 78 and 80 and thus hold the core of the EHC against axial movement or telescoping especially in a downstream direction.

Disposed between and in contact with monolith units 78 and 80 is an electrically heatable catalytic converter 84 built up in the same way as the electrically heatable catalytic unit 18 shown in FIG. 1 except that the band 86 need not have the projecting portion 26 (FIGS. 4,5). The band 86 encircles the bundle of spirally wound overfolded corrugated thin metal strips 88 in the same manner as shown in the aforementioned Ser. No. 587,219, FIGS. 1, 2, 2a, 3, 4 and 5 thereof. The bundle of steel rods 34 (FIG. 3 hereof) project from either side of the spirally wound core 18, and corresponding recesses 90 and 92 are bored into the confronting faces 94 and 96 of the monoliths 78 and 80 to accept the projecting ends 98 and 100 as shown in FIG. 8. The bore 92 in the downstream monolith 80 communicates with an axial bore 102 to accept a conducting rod 104 which is in turn welded at its inner end 108 to radially extending rod 106. The distal extremity of the rod 106 may be welded to the housing 70 at the point of exit, and threaded as at 110 to accept a support nut and a clamping nut (not shown) to hold a cable terminal from the ground pole of the voltage source 112 schematically shown. The positive terminal 113 is inserted through an insulated feedthrough 114 in any suitable manner (see, for example, the insulated feedthrough shown in FIG. 4, items 74, 76 in Ser. No. 587,219, supra). The terminal 113 is welded at its inner end 116 to the band 86 surrounding and holding the bundle 84. The terminal 113 is threaded at its distal extremity 118 to accept and retain a cable from the voltage source 112. The monoliths 78 and 80 have from 16 to 400 cells per square inch, are desirably formed of extruded ceramic, each 1" to 3", preferably 2" in axial dimension, and catalysed with a noble metal catalyst. The upstream portion 78, or brick 78, may be omitted if desired. The bricks 78 and 80 are pushed tight against the EHC unit 84. The fit between the ceramic mat 82 and the housing 70 is tight to prevent slippage downstream and telescoping of the core 84 of the EHC. The ceramic unit O.D. may be the same or different from the EHC O.D. A thermocouple 119 is provided. The junction 121 is located within the EHC 84 with the leads extending through the housing 70 by means of an insulated feed through 123 and with an instrument plug 125.

Figure 10:
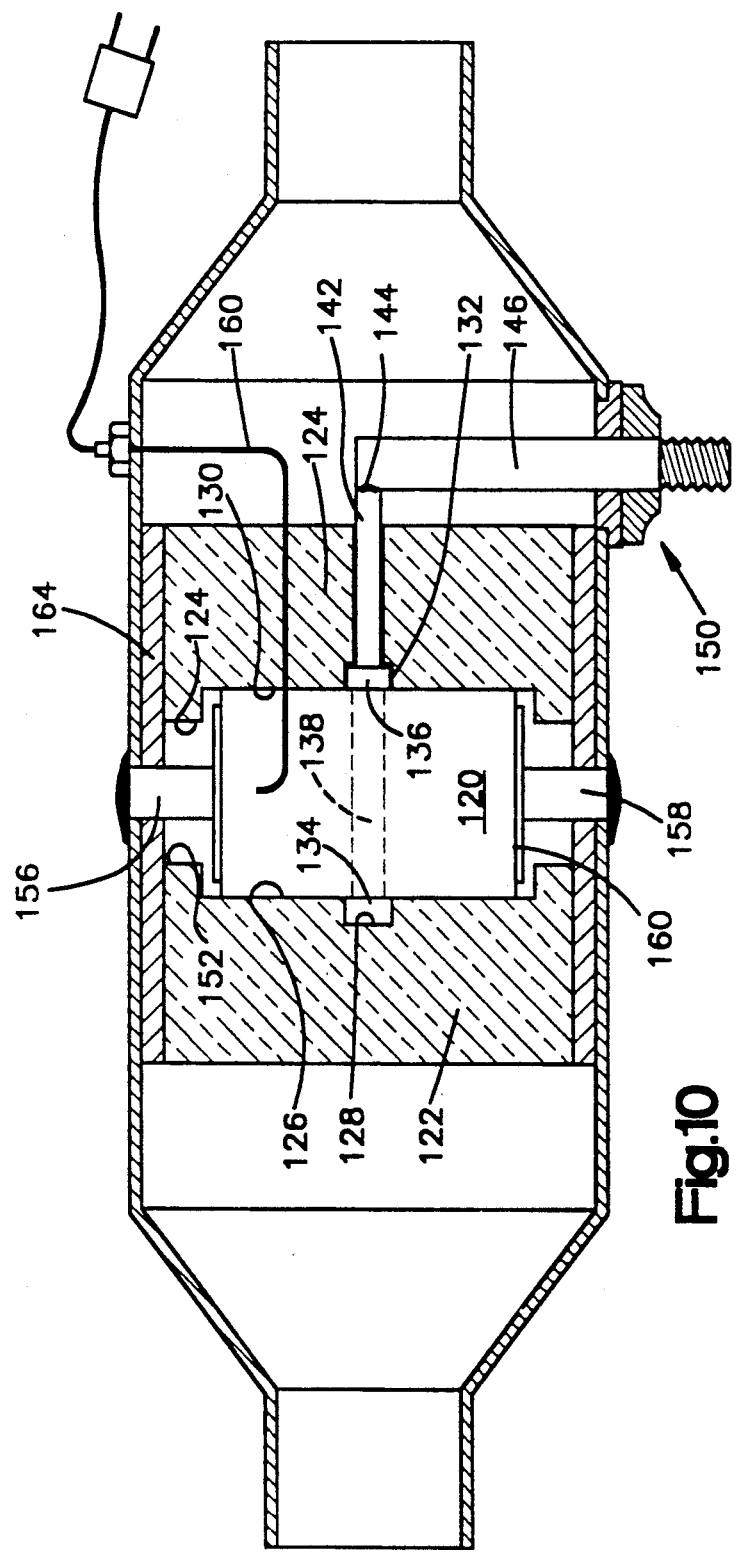
FIG. 10 is a cross-sectional view of another composite catalytic converter in accordance with this invention showing an EHC partially embedded in confronting faces of ceramic polycellular catalytic converter portions.

FIG. 10 shows in cross-section another embodiment of the present invention. Here the EHC 120 has a diameter less than the diameter of the ceramic portions 122 and 124. The upstream portion 122 is provided with a suitable bore 126 and recess 128. The downstream portion 124 is provided with a suitable bore 130 and a recess 132. The recesses 128 and 132 are provided to accommodate the extending portions 134 and 136 of the core bar 138. The downstream recess 132 is counter bored with a hole 140 to accept a current carrying axial bar 142 which is welded at its downstream extremity 144 to a radial current carrying bar 146 which extends through the housing 148. The extension through the housing is insulated from the housing 148 by a suitable feedthrough generally indicated at 150. Reference may be had to FIG. 3 of Ser. No. 587,219 for details of a suitable feedthrough. The confronting faces 152 and 154 of the ceramic portions 122 and 124 are axially spaced about 0.5" to accommodate one or more radially extending current carrying bars 156 and 158. The inner ends of the bars 156 and 158, respectively, are welded to a retaining band 160 binding the plurality of overfolded corrugated thin metal foil strips forming the core 120 of the EHC as previously described. The outer ends of the bars 156 and 158 are conveniently welded to a housing 148. One the bars 156 or 158 may be extended and threaded at its distal extremity to accommodate a cable attachment lug, not shown.

FIG. 10 also shows a thermocouple leading into the EHC 120 and existing the housing 148 through a suitable feed-through 162 for example, as shown in FIG. 3. of Ser. No. 587,219. The ceramic blocks 122 and 124 are held in place within the housing 148 by a circumferential ceramic mat 164 compressed in the space between the housing 148 and the ceramic blocks or portions 122 and 124.

The tight juxtaposition of the ceramic block or portion 124 against the downstream end of the core 120 prevents the core 120 from telescoping in a downstream direction.

There has thus been provided a means for enhancing the performance of spirally wound, or S-wound corrugated thin metal electrically heatable catalytic converters by forming a composite catalytic converter, one portion being an EHC and the other being a conventional catalytic converter. The two portions are arranged in juxtaposition by embedding the EHC partially or wholly within the conventional catalytic converter. The composite, which can be either a retrofitted device, as in FIGS. 1-8, or an OEM device, FIGS. 9 and 10, is adapted to fit in a conventional exhaust system and has the durability to withstand rigorous testing by manufacturers and thereby prove durable under extreme user conditions. The devices of the present invention can be contained in a single can or housing located in the exhaust line under the floor of a vehicle or adjacent the engine exhaust manifold.

What is claimed is:

1. A composite polycellular catalytic converter for removing pollutants from an exhaust gas stream comprising (a) a housing, (b) a polycellular electrically heatable catalytic converter comprising a monolith core formed of nonnesting corrugated thin metal strips overfolded once at their midpoints and in electrically conducting relation with an electrically conducting central core located at the midpoint of each strip, and said metal strips being wound in a spiral about said central core to form a polycellular bundle, the free ends of each overfolded strip being electrically conducting, a binder ring in electrical contact with said free ends for binding the wound strips into a polycellular core, means for conducting electrical power from a voltage source to said electrically heatable catalytic core, (c) a polycellular conventional ceramic catalytic monolith in juxtaposed coaxial relation downstream of said electrically heatable catalytic converter, and (d) means for holding said conventional ceramic catalytic monolith in fixed axial relation in said housing.

2. A composite polycellular catalytic converter as defined in claim 1 wherein the polycellular conventional catalytic converter is extruded ceramic having a cell density in the range of from 16 to 400 cells per square inch.

3. A composite polycellular catalytic converter as defined in claim 1 wherein the corrugated thin metal strips are corrugated ferritic stainless steel strips.

4. A composite polycellular catalytic converter as defined in claim 3 wherein the thin metal strips are corrugated in a herringbone pattern.

5. A composite polycellular catalytic converter as defined in claim 3 wherein the thin metal strips are nonnesting and corrugated in a straight through pattern.

6. A composite polycellular catalytic converter as defined in claim 1 wherein the electrically heatable catalytic converter monolith is embedded in the upstream face of the conventional ceramic catalytic converter.

7. A composite polycellular catalytic converter as defined in claim 1 wherein the electrically heatable catalytic converter monolith is in juxtaposed relation with the upstream face of the conventional ceramic catalytic converter.

8. A composite polycellular catalytic converter as defined in claim 7 wherein the electrically heatable catalytic converter monolith is also in juxtaposed relation with the downstream face of a conventional ceramic catalytic converter.

9. A composite polycellular catalytic converter as defined in claim 1 wherein the electrically heatable catalytic converter is partially embedded in a conventional ceramic catalytic converter located downstream of said electrically heatable catalytic converter.

10. A composite polycellular catalytic converter as defined in claim 1 wherein the electrically heatable catalytic converter is partially embedded in a downstream conventional ceramic catalytic converter and partially embedded in an upstream conventional ceramic catalytic converter.

11. A composite polycellular catalytic converter as defined in claim 1 wherein the corrugated thin metal strips have a coating of a refractory metal oxide on at least one surface thereof.

12. A composite polycellular catalytic converter as defined in claim 11 wherein the refractory metal oxide is gamma alumina.

13. A composite polycellular catalytic converter as defined in claim 11 wherein the refractory metal oxide has a noble metal catalyst supported thereon.

14. A composite polycellular catalytic converter as defined in claim 11 wherein the refractory metal oxide is gamma alumina having a minor amount of a rare earth metal selected from the group consisting of cerium, lanthanum, neodymium, praseodymium and yttrium contained therein.

15. A composite polycellular catalytic converter as defined in claim 13 wherein the refractory metal oxide is gamma alumina and the noble metal catalyst is selected from platinum, palladium, rhodium, ruthenium, and mixtures of two or more of such metals.

16. A composite polycellular catalytic converter as defined in claim 1 wherein the electrically heatable catalytic converter has a cell density of from 100 to 700 cells per square inch.

17. A composite polycellular catalytic converter as defined in claim 1 wherein the conventional catalytic converter is ceramic and has a cell density of from 200 to 400 cells per square inch.

18. A composite polycellular catalytic converter as defined in claim 1 wherein the electrically heatable catalytic converter is axially disposed between and in contact with upstream and downstream portions of a ceramic conventional catalytic converter.

19. A composite polycellular catalytic converter as defined in claim 18 wherein the upstream and downstream portions of the conventional catalytic converter are each encircled with an insulating ceramic felt disposed under compression between the housing and the ceramic portions whereby resistance to axial movement is achieved.

* * * * *